United States Patent
Wagaj et al.

(10) Patent No.: US 11,262,190 B2
(45) Date of Patent: Mar. 1, 2022

(54) MEASUREMENT OF TOOTHED ARTICLES ON A COMPOSITE MACHINE TESTER PLATFORM UTILIZING A NON-CONTACT SENSOR

(71) Applicant: GLEASON METROLOGY SYSTEMS CORPORATION, Dayton, OH (US)

(72) Inventors: Parag Prakash Wagaj, Springboro, OH (US); Douglas Charles Beerck, Dayton, OH (US); Ethan James Shepherd, West Carrollton, OH (US); Michael R. Tanner, Cincinnati, OH (US); Edward J. Damron, Waynesville, OH (US); Aaron Timothy Slusser, Eaton, OH (US)

(73) Assignee: GLEASON METROLOGY SYSTEMS CORPORATION, Dayton, OH (US)

( * ) Notice: Subject to any disclaimer, the term of this patent is extended or adjusted under 35 U.S.C. 154(b) by 0 days.

(21) Appl. No.: 16/651,172

(22) PCT Filed: Oct. 23, 2018

(86) PCT No.: PCT/US2018/057000
§ 371 (c)(1),
(2) Date: Mar. 26, 2020

(87) PCT Pub. No.: WO2019/083932
PCT Pub. Date: May 2, 2019

(65) Prior Publication Data
US 2020/0292305 A1 Sep. 17, 2020

Related U.S. Application Data

(60) Provisional application No. 62/575,631, filed on Oct. 23, 2017.

(51) Int. Cl.
*G01B 11/24* (2006.01)
*G01B 11/00* (2006.01)
*G01M 13/021* (2019.01)

(52) U.S. Cl.
CPC ........ *G01B 11/2416* (2013.01); *G01B 11/005* (2013.01); *G01M 13/021* (2013.01)

(58) Field of Classification Search
CPC .... G01B 11/2416; G01B 7/283; G01B 11/06; G01B 5/202; G01B 7/003; G01B 7/22;
(Continued)

(56) References Cited

U.S. PATENT DOCUMENTS 3,583,072 A * 6/1971 Muller ...................... G01B 5/20
33/501.13
4,547,674 A * 10/1985 Pryor ...................... G01S 17/48
250/559.23

(Continued)

FOREIGN PATENT DOCUMENTS

CN 201163235 Y * 12/2008
CN 102749003 B * 1/2015
(Continued)

OTHER PUBLICATIONS

International Search Report and Written Opinion for PCT/US2018/057000, ISA/EPO, dated Jan. 24, 2019, 10 pgs.

*Primary Examiner* — Michael P Stafira
(74) *Attorney, Agent, or Firm* — Robert L. McDowell

(57) ABSTRACT

A method and machine comprising at least one non-contact sensor (52) on a functional testing platform (50) for workpiece inspection and/or measurement. The inclusion of at least one non-contact sensor on the functional testing platform results in the combination of two machine platforms into a single machine and provides the user with measure-
(Continued)

ment characteristics of both methods, functional and analytical, saving significant cycle time and significant space.

20 Claims, 6 Drawing Sheets

(58) Field of Classification Search
CPC ........ G01B 7/282; G01B 11/14; G01B 21/20;
G01B 11/002; G01B 11/024; G01B
11/028; G01B 11/03; G01B 11/24; G01B
11/2433; G01B 11/2441; G01B 11/25;
G01B 11/2522; G01B 11/26; G01B
11/27; G01B 11/272; G01B 5/0004;
G01B 7/30; G01B 9/08; G01B 21/00;
G01B 5/166; G01B 5/008; G01B 5/20;
G01B 11/005; G01B 5/24; G01B 11/00;
G01B 7/008; G01B 21/32; G01B 5/02;
G01B 5/12; G01B 7/16; G01B 11/026;
G01B 11/0608; G01B 11/08; G01B
11/2425; G01B 7/02; G01B 7/28; G01B
7/146; G01B 5/204; G01B 3/48; G01B
3/40; G01B 3/008; G01B 5/163; G01B
11/245; G01B 5/012; G01B 5/205; G01B
5/207; G01B 5/242; G01B 7/001; G01B
21/04; G01B 3/002; G01B 5/00; G01B
5/009; G01B 11/0633; G01B 11/065;
G01B 21/042; G01B 2210/56; G01B
5/0002; G01B 9/02039; G01B 11/2408;
G01B 11/2513; G01B 21/02; G01B
21/16; G01B 3/004; G01B 3/166; G01B
3/22; G01B 3/26; G01B 3/36; G01B
3/42; G01B 3/50; G01B 5/004; G01B
7/012; G01B 7/148; G01B 9/04; G01N
21/9515; G01N 21/952; G01N 27/9006;
G01N 21/8806; G01N 21/91; G01N
21/95; G01N 27/025; G01N 27/9026;
G01N 27/9046; G01N 29/2412; G01N
29/265; G01N 17/04; G01N 21/01; G01N
21/8803; G01N 21/954; G01N 2201/02;
G01N 2291/0237; G01N 2291/2693;
G01N 2291/2696; G01N 23/20; G01N
23/203; G01N 25/72; G01N 27/84; G01N
27/90; G01N 27/902; G01N 27/904;
G01N 29/043; G01N 29/069; G01N
29/07; G01N 29/11; G01N 29/14; G01N
29/225; G01N 29/226; G01N 29/2437;
G01N 29/2456; G01N 29/262; G01N
29/32; G01N 29/4418; G01N 29/4463;
G01N 33/574; G01N 33/57484; G01N
2800/52; G01N 33/5058; G01N 33/6872;
G01N 33/5023; G01N 33/53; G01N
33/566; G01N 33/6863; G01N 33/5041;
G01N 33/5085; G01N 33/5088; G01N
33/6896; G01N 33/6893; G01N 19/04;
G01N 2333/70596; G01N 2800/7042;
G01N 33/5017; G01N 33/5743; G01N
2021/8835; G01N 2021/8845; G01N
21/8901; G01N 2333/4706; G01N
27/44791; G01N 33/68; G01N 2203/021;
G01N 2203/0296; G01N 2333/70557;
G01N 2333/99; G01N 3/00; G01N 3/08;
G01N 30/06; G01N 33/4833; G01N
33/5044; G01N 33/536; G01N 33/573;
G01N 17/002; G01N 21/345; G01N
2203/0098; G01N 2203/0206; G01N
2203/0252; G01N 2203/04; G01N
2291/044; G01N 2291/102; G01N
2333/57; G01N 2333/70503; G01N
2500/10; G01N 27/82; G01N 29/30;
G01N 33/5038; G01N 33/57415; G01N
33/57492; G01N 33/6848; G01N
33/6854; G01N 33/686; G01N 33/94;
G01N 1/14; G01N 11/16; G01N 15/08;
G01N 19/02; G01N 2021/7759; G01N
2033/0078; G01N 2035/00108; G01N
2035/00801; G01N 2035/0406; G01N
2035/0415; G01N 2035/0467; G01N
2035/1062; G01N 21/78; G01N 21/80;
G01N 21/90; G01N 21/9054; G01N
2203/0003; G01N 2203/0016; G01N
2203/0017; G01N 2203/0025; G01N
2203/0037; G01N 2203/0053; G01N
2203/0208; G01N 2203/027; G01N
2203/0278; G01N 2203/0282; G01N
2203/0405; G01N 2203/0447; G01N
2203/0676; G01N 2203/0682; G01N
2291/011; G01N 2291/02818; G01N
2291/0422; G01N 2291/0423; G01N
2291/0425; G01N 2291/262; G01N
2333/35; G01N 29/022; G01N 29/2425;
G01N 3/04; G01N 3/24; G01N 3/40;
G01N 3/42; G01N 3/56; G01N 3/62;
G01N 33/15; G01N 33/48; G01N 33/493;
G01N 33/5047; G01N 33/5695; G01N
33/57434; G01N 35/026; G01N 35/04;
G01N 35/10; G01M 13/021; G01M
13/028; G01M 13/02; G01M 13/00;
G01M 13/025; G01M 1/34; G01M 7/02;
G01M 11/081; G01M 17/00; G01M
13/04; G01M 13/027; G01M 17/007;
G01M 11/005; G01M 11/025; G01M
99/007; G01M 11/0271; G01M 15/06;
G01M 17/0078; G01M 1/045; G01M
11/35; G01M 11/37; G01M 17/0074;
G01M 17/021; G01M 17/022; G01M
3/083; G01M 9/04; G01M 99/005; G02B
2005/1804; G02B 5/1819; G02B 5/1866;
G02B 21/0016; G02B 6/3846; G02B
6/3849; G02B 6/3897
See application file for complete search history.

(56) References Cited

U.S. PATENT DOCUMENTS

| | | | | |
|---|---|---|---|---|
| 4,910,561 A * | 3/1990 | Tsujiuchi | ............... | G01B 9/021 356/458 |
| 4,931,949 A * | 6/1990 | Hernandez | .......... | G01M 13/021 340/683 |
| 5,373,735 A * | 12/1994 | Gutman | ............. | G01M 13/021 33/501.07 |
| 5,978,500 A * | 11/1999 | Broughton | ............ | G06T 7/0004 382/141 |
| 2005/0247132 A1* | 11/2005 | Hamidieh | ........... | G01M 13/028 73/660 |
| 2009/0249633 A1* | 10/2009 | Patrick | .................. | G01M 13/02 33/501.19 |
| 2015/0066390 A1* | 3/2015 | Chen | ................... | G01M 13/021 702/35 |

FOREIGN PATENT DOCUMENTS

| CN | 205748298 U | | 11/2016 |
|---|---|---|---|
| CN | 206002073 U | * | 3/2017 |

(56) References Cited

FOREIGN PATENT DOCUMENTS

| | | | |
|---|---|---|---|
| DE | 4216779 A1 * | 12/1992 | ......... G01B 11/2416 |
| DE | 4142676 A1 | 7/1993 | |
| DE | 10140103 C1 * | 8/2002 | .......... G01M 13/021 |
| DE | 10123496 A1 * | 12/2002 | .......... G01M 13/021 |
| DE | 10012158 B4 * | 4/2012 | .......... G01M 13/021 |
| GB | 2057133 A * | 3/1981 | ............ G01B 21/20 |
| GB | 2223587 A * | 4/1990 | .......... G01M 13/021 |
| JP | 2013221845 A * | 10/2013 | |
| WO | 01/01072 A1 | 1/2001 | |
| WO | WO-0101072 A1 * | 1/2001 | ......... G01B 11/2416 |

* cited by examiner

MEASUREMENT OF TOOTHED ARTICLES ON A COMPOSITE MACHINE TESTER PLATFORM UTILIZING A NON-CONTACT SENSOR

FIELD OF THE INVENTION

The invention relates to the measurement of workpieces including gears and other toothed articles and in particular to such measurement utilizing one or more non-contact sensors on a functional measurement platform and the production of analytical as well as functional test results on a single platform. The analytical and functional measuring may be carried out simultaneously or independently of one another thereby giving the user freedom to select one or both measurement methods.

BACKGROUND OF THE INVENTION

For many years dimensional inspection (i.e. measurement) of gears and gear-like workpieces (e.g. cylindrical and bevel gears, worms) has mostly been carried out by two different methodologies, namely, (1) functional testing comprising meshing a gear or other toothed workpiece with a known master gear or mating gear, and (2) analytical testing using a coordinate measurement machine (CMM) or a gear measurement machine (GMM) such as the GMS line of gear measurement machines manufactured by Applicant.

Functional testing compares the measurement of a work piece against a master gear or a mating gear. For example, on a typical double flank gear roll testing machine, as shown in FIG. 1, a work piece (e.g. cylindrical gear) is meshed with a known master part (e.g. cylindrical gear) and rotated. One of the gears is mounted on a fixed axis and other is mounted on a floating axis. The linear displacement between the axes is measured when the two gears are rotated. Composite errors from this functional testing, such as center distance variation, are reported and compared against required tolerances. Such a roll tester is also capable of reporting characteristics related to the size of gear teeth such as tooth thickness and diameter-over-pins (DOP).

Functional testing platforms for gears (i.e. roll testers) include those testers known as double flank testers and single flank testers. With single flank testing, mating gears roll together at their proper (fixed) center distance with backlash and with only one flank in contact. Gears can be tested in pairs or with a master gear. With double flank testing, mating gears are rolled together in tight mesh which produces contact on both flanks. A work gear is meshed with master gear. By providing various encoders on the platform, the relative movement of gears (i.e. center distance variation) making up a collection or summary of gear errors is captured. Some of the errors measured using double flank testers are mentioned below.

Fi/Tcv (Total Composite Variation or Total Center Distance Variation)
fi (Tooth To Tooth error)
Average DOP (Average Dimension Over Pins)
Average Circular Tooth thickness (determined from center distance changes)
Minimum and maximum DOP
Minimum and maximum circular tooth thickness As mentioned above, analytical testing of gears is usually done by a GMM or CMM. These machines comprise a computer controlled apparatus which includes a high resolution touch sensor (i.e. tactile) probe and are used to identify individual gear manufacturing errors versus a collection of errors as shown in functional testers such as double flank testers. An example of an analytical machine for measuring a gear workpiece is shown in FIG. 2. Such instruments utilizing tactile probes are generally used to determine, for example, the shape, location, and relationships of many kinds of test piece features (e.g. gear tooth, part datum, journals).

Some of the most common characteristics measured on cylindrical gears (i.e. spur and helical gears) using an analytical machine include (but are not limited to):

Index (Spacing) errors
Lead (Helix) errors
Profile (Involute) errors
Tooth thickness
Angular position of one gear tooth with respect to another gear tooth to a known feature such as keyway on gear shaft
Tooth topography
Waviness
Tip and/or root diameter
Chamfer width Some of the most common characteristics measured on bevel gears (including straight, spiral and hypoid gears) using an analytical machine include (but are not limited to):

Index (Spacing) errors
Deviation from theoretical location at defined points (e.g. 45 points at predefined locations) on gear surface
Topographical measurements
Waviness It is also known to measure certain parts by non-contact methods on a CMM. Optical (e.g. laser) measuring and/or inspection of workpieces, such as gears, is disclosed in, for example, U.S. Pat. No. 4,547,674 to Pryor et al. However, with such optical methods, finding a tooth as well as the reference points (e.g. pitch point and tooth edge) is quite time consuming and is not as repeatable as touch probe. Also, accuracy of certain features with a non-contact probe is limited when compared to a tactile probe.

Recently, the Applicant introduced a GMM comprising a touch probe in combination with optical probe to measure those characteristics of a gear previously determined using only an optical probe.

SUMMARY OF THE INVENTION

The invention is directed to a method and machine comprising at least one non-contact sensor on a functional testing platform for workpiece inspection and/or measurement. The inclusion of at least one non-contact sensor on the functional testing platform results in the combination of two machine platforms into a single machine and provides the user with measurement characteristics of both methods, functional and analytical, saving significant cycle time and significant space.

DETAILED DESCRIPTION OF THE PREFERRED EMBODIMENT

Figure 1:
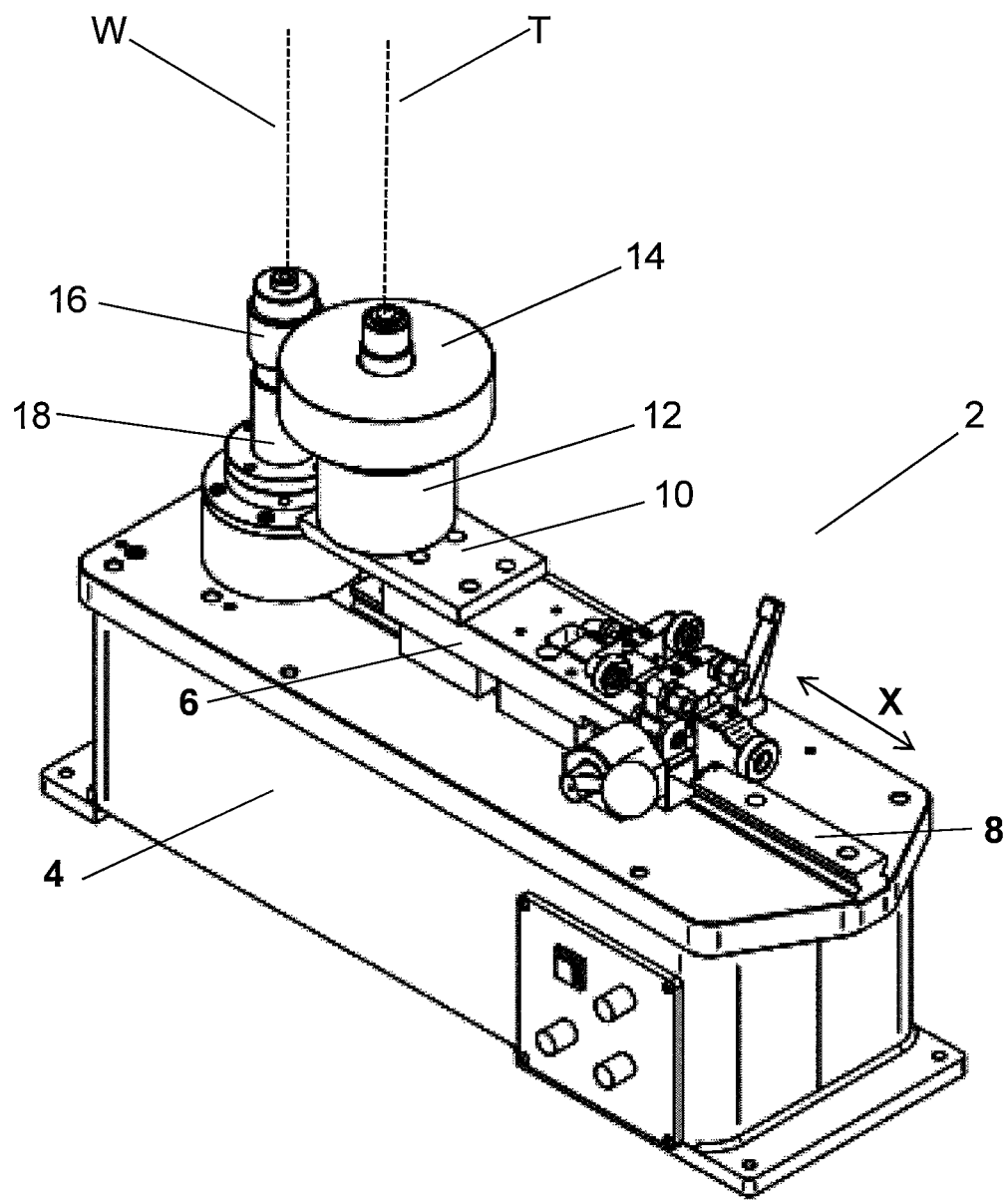
FIG. 1 shows a standard roll testing machine (functional tester).

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The details of the invention will now be discussed with reference to the accompanying drawings which illustrate the invention by way of example only. In the drawings, similar features or components will be referred to by like reference numbers. For a better understanding of the invention and ease of viewing, doors and any internal or external guarding have been omitted from the drawings.

The use of "including", "having" and "comprising" and variations thereof herein is meant to encompass the items listed thereafter and equivalents thereof as well as additional items. Although references may be made below to directions such as upper, lower, upward, downward, rearward, bottom, top, front, rear, etc., in describing the drawings, these references are made relative to the drawings (as normally viewed) for convenience. These directions are not intended to be taken literally or limit the present invention in any form. In addition, terms such as "first", "second", "third", etc., are used herein for purposes of description and are not intended to indicate or imply importance or significance.

FIG. 1 shows a standard roll testing machine 2 which is a functional tester. The machine includes a base 4 on which a slide 6 is linearly movable on a rail 8 in direction X. A slide plate 10 is affixed to slide 6 and a suitable arbor 12 is positioned on plate 10. A master gear 14 is mounted to workholding arbor 12 for rotation about axis T which is a floating axis due to the slide 6 and rail 8 arrangement. A work piece 16 is mounted to a suitable workholding arbor 18 for rotation about a fixed axis W. The linear displacement between the axes W and T is measured when the two gears 14, 16 are rotated in mesh. The master gear and measured gear are typically reversed but can be measured in either orientation.

Figure 2:
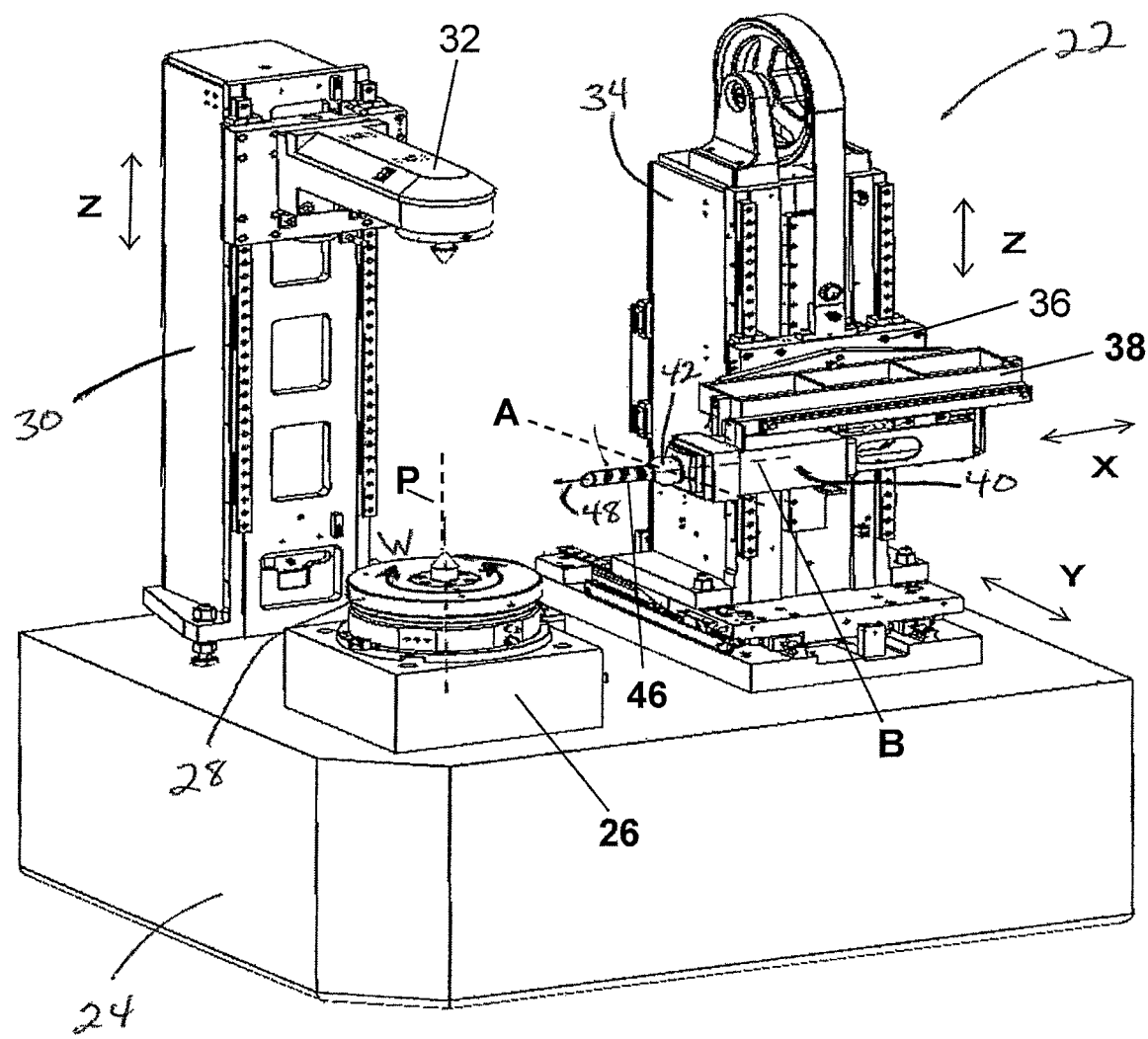
FIG. 2 illustrates a known type of gear measuring machine (analytical tester).

FIG. 2 shows an example of a computer-controlled gear measuring machine (GMM) 22 for the analytical measuring and inspection of gears, tools and other types of complex-shaped workpieces, particularly, but not limited to, workpieces comprising teeth. Machine 22 comprises a base 24, workpiece spindle support base 26 and workpiece spindle 28. A workpiece, such as a spur or helical gear, is positioned on spindle 28 via suitable workholding equipment (not shown) as is understood by the skilled artisan. The workpiece is rotatable in either direction W about a workpiece axis P. If desired, a tailstock column 30 and tailstock 32 may be included with the height of tailstock 32 being adjustable along the height of column 30 in the vertical direction Z.

Machine 22 further includes a vertical axis column 34 located on base 24. Vertical axis column 34 is movable horizontally on base 24 in the Y direction. A vertical saddle 36 is positioned on vertical axis column 34 and is movable along column 34 in the Z direction. A horizontal slide 38 is attached to vertical saddle 36 and a probe arm 40 is attached to horizontal slide 38. Probe arm 40 is movable horizontally in the X direction along probe axis B and includes an indexable probe support head 42 on which a probe is positioned. Probe support head 42 is indexable about axis B as well as about an axis A wherein axis A extends in the Y direction and is oriented perpendicular to axis B. For purposes of reference in FIG. 2, directions X, Y and Z are preferably mutually perpendicular to one another, workpiece axis P extends in the Z direction and probe axis B extends in the X direction.

FIG. 2 further shows the placement of a tactile probe 46 on probe support head 42. Tactile probe 46 usually includes a spherical tip 48 generally comprised of a ruby. Probe 46 can be replaced with a diamond tipped probe which may be moved along the surface of a workpiece to measure surface roughness (i.e. surface finish). Alternatively, a probe known as a Barkhausen probe may be positioned on probe support head 42 for the detection of burns on a workpiece surface resulting from grinding.

The present inventive method and machine comprises at least one non-contact sensor on a functional testing platform for workpiece inspection and/or measurement.

Figure 3:
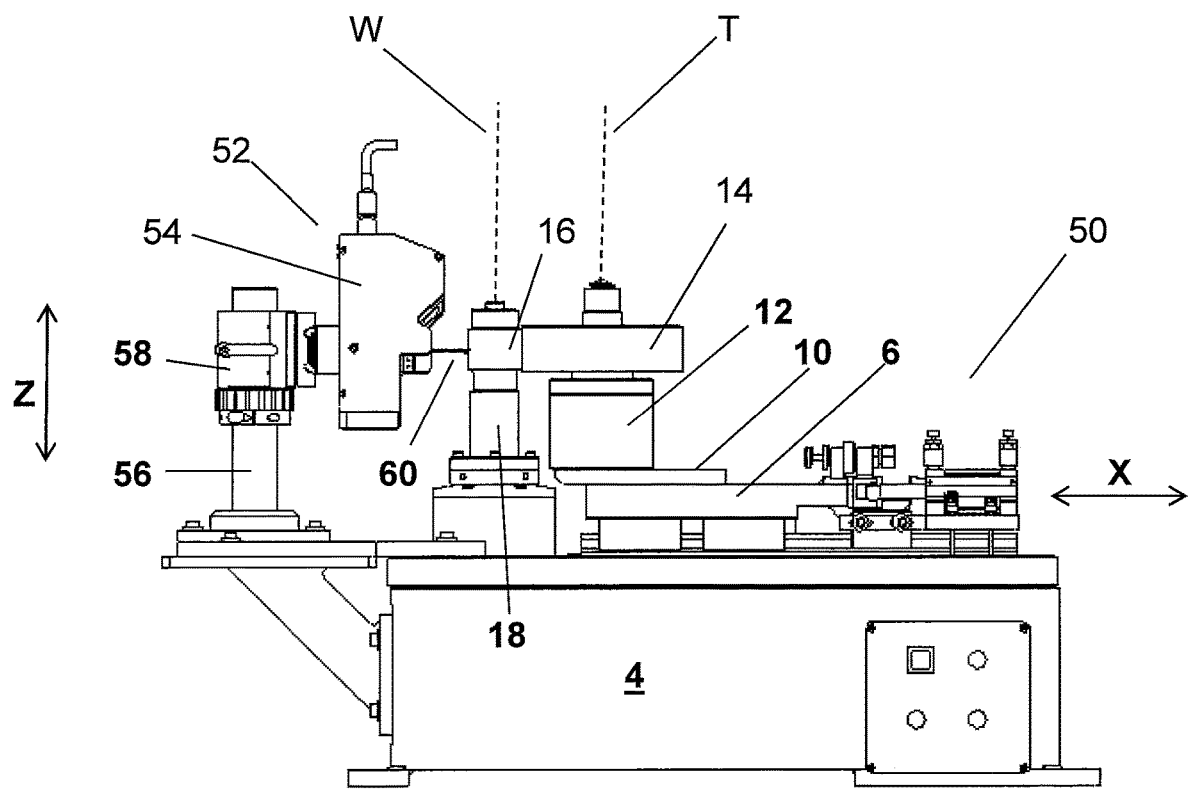
FIG. 3 is a front view of the inventive machine showing two gears in rolling engagement and non-contact inspecting of one of the gears.
Figure 4:
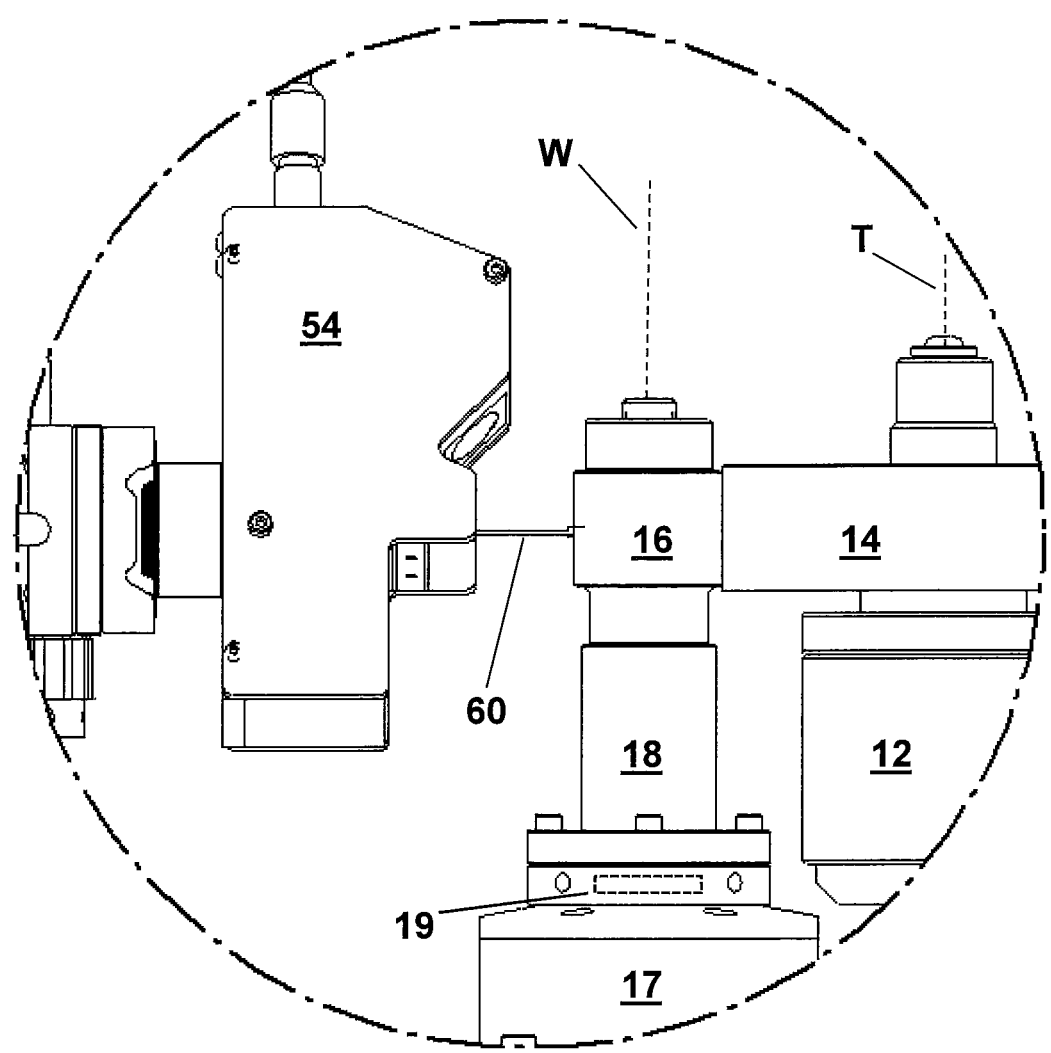
FIG. 4 is an enlarged view of the non-contact sensor inspecting portion of FIG. 3.
Figure 5:
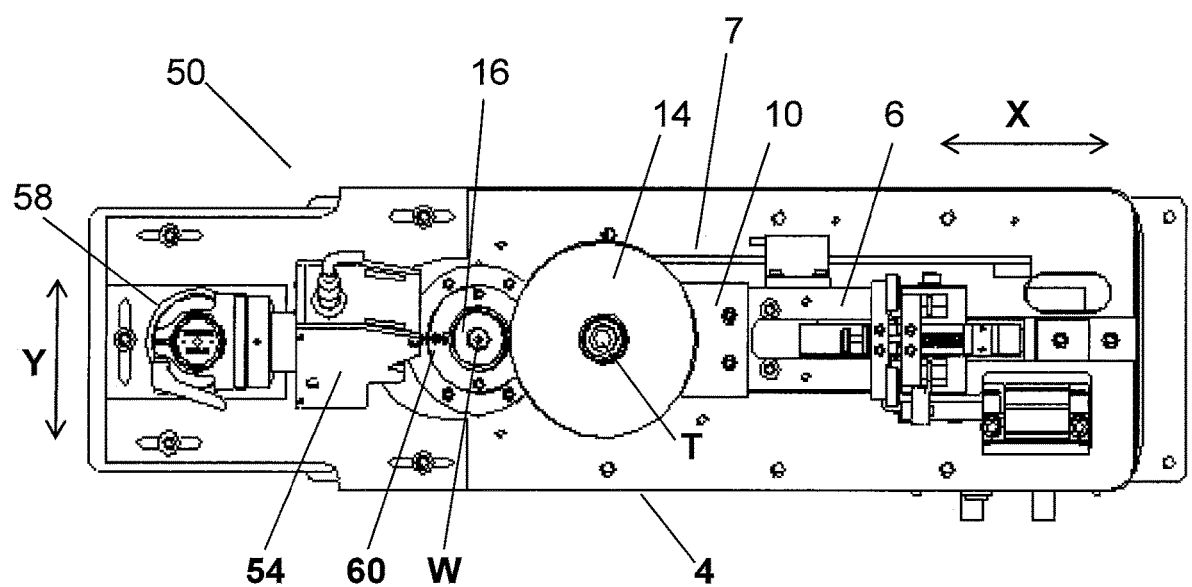
FIG. 5 is a top view of the machine of FIG. 3.

FIGS. 3, 4 and 5 show the inventive machine 50 comprising a production gear 16 (i.e. the workpiece) and master gear 14 mounted on respective workholding arbors 18 and 12, such as mechanical, hydraulic or pneumatic arbors as is known to the skilled artisan. The production gear 16 may be located on either the left hand side or on the right hand side of the master gear 14 but is shown on the left side in FIG. 3. The gear 16 rotates on a motorized axis W via motor 17. The master gear 14 is mounted on right hand side (axis T) and is not motorized. The rotation of master gear 14 is provided by the driving motor 17 for axis W and the engagement with the production gear 16.

The master gear is on a slide 6 (X axis) and is moveable in the direction of the X axis to allow coupling and decoupling of gears. Decoupling is required so that the production gear 16 can be removed and replaced with different work pieces either manually or via automation means. A linear scale 7 (FIG. 5) is mounted to capture movement of the slide 6 in the X axis direction. A rotary encoder 19 is mounted below the motorized production gear 16 (axis W) to capture rotary movement of the workpiece gear. Inputs of the rotary encoder and the linear scale are captured so that during rotation of gear pair, relative movement of gears (in the X direction) is measured with respect to the rotary position of the workpiece gear 16. In some cases LVDT (Linear Voltage Displacement Transducer) probes may be included to measure for any runout errors of the workpiece arbor.

As shown in FIG. 3, a non-contact sensor such as a laser assembly 52 is positioned on left side of the machine. A single laser 54 is mounted on a linearly adjustable post 56 having an adjustable mounting mechanism 58 whereby the laser 54 is movable and positionable in up to three linear directions X, Y, Z (preferably mutually perpendicular) and in up to three rotational directions, that is, about each of X, Y and Z. In other words, laser 54 is preferably capable of six degree-of-freedom movement. Such adjustability is preferable in order to orient the laser line 60 onto a gear tooth space whereby it can capture at least a portion of the tooth involute (i.e. profile direction) from root-to-tip for both tooth flanks of adjacent teeth.

Depending upon the particular gear geometry, the laser will also measure a portion of the gear in the lead direction. Based on the width of the sensor field of view and the rotational position of the sensor around the X axis, the laser will be able to see a few millimeters of face width (i.e. lengthwise direction), for example 3-4 mm, from which lead errors can be determined. With the freedom to orient the non-contacting sensor, the invention is capable of measuring analytical errors related to profile and index characteristics of the workpiece.

The laser sensor 54 has its own controller (not shown) which is triggered by the rotary encoder. The laser controller records the laser data and the corresponding rotary encoder position. This data collection is done during rotation of work gear. There are also alternate ways to read rotary encoder and laser data and synch them during the measurement cycle such as feeding the signal of both into hardware device connected to a PC.

While gears 16 and 14 are rotating, laser 54 collects the point cloud data during entire rotation of the workpiece gear 16. The collected data is sorted to capture point data for each tooth gap of gear 16. The data is further analyzed to determine involute and index error of each tooth flank. The cycle time of such analytical measurements is much faster compared to a CMM or a GMM. For example, for a 31 tooth automotive pinion, index and involute testing for all teeth is measured within about 10 seconds. For comparison, a typical cycle time for the same pinion and measurements on a CMM or a GMM is at least 130 seconds.

Although the invention has been discussed with respect to double flank testing, the invention is also equally applicable to single flank testing. In addition, while one non-contacting sensor (e.g. laser) has been discussed, more than one non-contacting sensor may be included on the machine. For example, two lasers may be mounted on the same machine platform so that each laser can be oriented at separate flanks (i.e. right flank and left flank) of the gear to collect index and profile data. The arrangement of two lasers is particularly advantageous when gear depth or space increases beyond the range of one laser.

More than two lasers may be mounted at different heights so as to capture a partial tooth surface or the entire tooth surface of both sides of a gear tooth. The two lasers may be mounted at different heights on the same post 56. Up to four lasers are generally sufficient for typical automotive pinion gears however the quantity of lasers may be increased based on gear dimensions. For example, two lasers mounted to each of two posts would generally be sufficient. All lasers capture data from different portions of gear teeth during rotation of the gear. Combined data is synched and analyzed to obtain point cloud of all teeth which is further analyzed to obtain index, lead and involute data.

The laser may also be moved relative to a workpiece so that a partial or the entire tooth surface of both sides of gear tooth can be scanned and captured by laser. Either by using multiple lasers as discussed above or by introducing relative motion between lasers and a workpiece, one may capture a point cloud for a partial (e.g. 80-90%) or for the entire tooth surface of both sides of gear tooth in both depth (profile) and face width (lead) directions.

Figure 6:
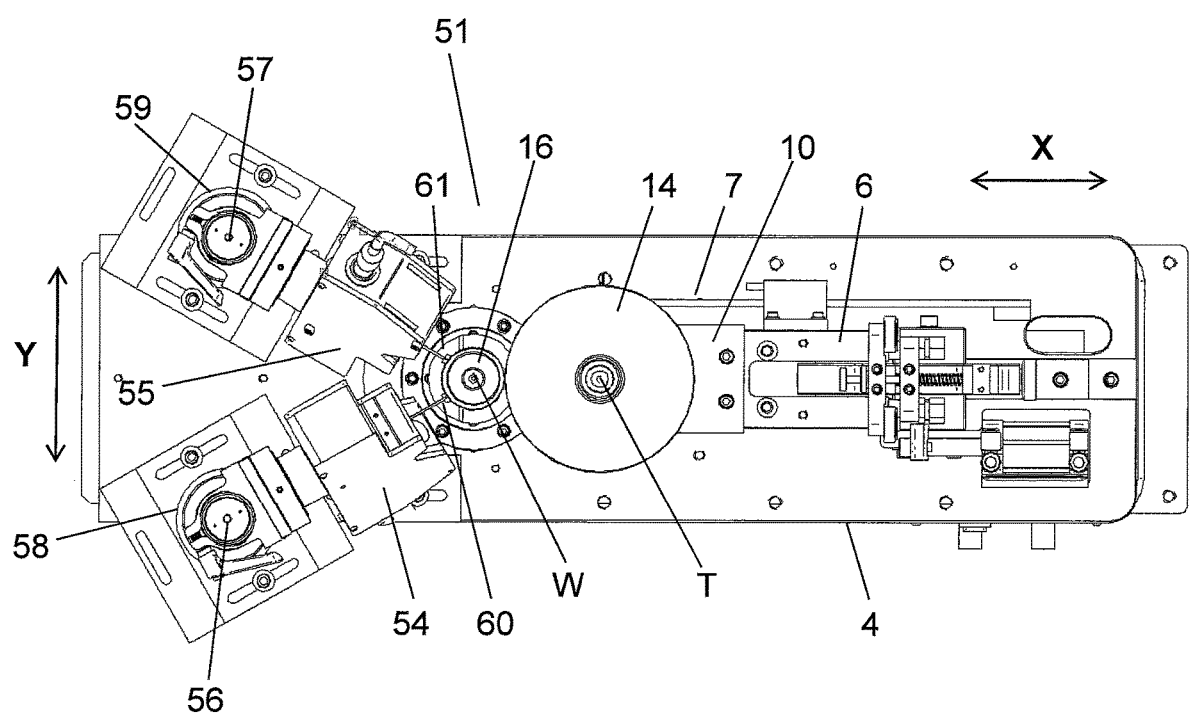
FIG. 6 is a top view of a modification to FIGS. 3-5 wherein multiple non-contact sensors are shown.

FIG. 6 shows an embodiment which is a modification of FIGS. 3-5 wherein two posts 56, 57 are included on a machine 51. Two non-contact sensors 54, 55 (e.g. lasers) are mounted to respective posts 56, 57, via respective adjustable mounting mechanisms 58, 59, for scanning the tooth surfaces of workpiece 16 with their respective laser lines 60, 61. As mentioned above, two lasers may be mounted on each post and therefore, FIG. 6 may also be seen as representing a machine comprising four lasers directed upon workpiece 16.

The orientation and positioning of non-contacting sensor 54 may be set manually, as shown, or may be under the control of the machine computer control. The non-contact sensor, or plurality of sensors, may remain stationary during measuring or may be set in motion (e.g. in Z direction) so as to scan a partial face width (e.g. 80-90%) or the complete face width (i.e. tooth length) of a workpiece.

The relative positioning between a non-contact sensor, or a plurality of non-contact sensors, and a workpiece may be fixed so as to scan a partial tooth profile or the complete tooth profile (i.e. involute profile) of a workpiece. Also, relative motion in the X and/or Y directions between the sensor or sensors and the workpiece during scanning may be utilized so as to modify the scanned area of a partial profile or change the scanning of a complete profile to a partial profile (i.e. involute profile) of the tooth surfaces of the workpiece. For example, the full profile may be scanned at the ends and in the center of the teeth and a lesser amount of the profile (e.g. 70-80%) at areas in between the center and ends of the teeth.

With the invention, in addition to determining index, lead and profile measurements of a workpiece, as discussed above, scanning the workpiece with at least one non-contact sensor may also provide tooth surface data for determining other characteristics such as tooth thickness, angular position of gear teeth, tip and/or root diameter and chamfer width.

It should also be noted that both roll testing (single or double flank testing) and non-contact measurement may occur simultaneously or separately. Furthermore, for non-contact analytical measurement alone, only a workpiece is needed. A mating gear (e.g. master gear) is not necessary when performing only non-contact measurements.

The invention also combines the measurements of analytical and functional testing. Since measurements are made on a single machine platform, measurement data collected by the two different methods can be combined. This saves cycle time since the user does not have to run these tests separately.

The invention can be extended to other types of noncontact sensors such as camera or shadow graph projector.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A measuring machine for a toothed workpiece comprising a gear or other toothed article with said workpiece having a plurality of teeth and with each of said teeth having a pair of tooth flank surfaces, said machine comprising:
   a functional measuring mechanism operable to roll a toothed workpiece in mesh with a master gear or a mating gear, and
   an analytical measuring mechanism comprising at least one non-contact sensor operable to scan at least a portion of a tooth surface of said toothed workpiece in at least one of a profile direction and face width direction, said measuring machine further comprising said at least one non-contact sensor being movable in up to three mutually perpendicular directions and a slide movable in an X-axis direction to allow coupling and decoupling of the toothed workpiece and the master gear or mating gear, a motorized axis of rotation of the toothed workpiece and a rotary encoder mounted below the toothed workpiece, and means to capture inputs of a linear scale indicative of linear displacement between an axis of rotation of the toothed workpiece and an axis of rotation of the master gear or mating gear, said measuring machine being controlled to be operable to perform a method comprising:

scanning said workpiece, during rolling, with said analytical measuring mechanism to provide workpiece measurements with respect to characteristic of the teeth of said workpiece including at least one of index and profile, and performing one or both of double flank testing and single flank testing with said functional measuring mechanism, wherein the single flank testing comprises the master gear or mating gear rolling together with the toothed workpiece at a fixed center distance with backlash and with only one flank in contact and wherein the toothed workpiece is rotated via a motor.

2. The measuring machine of claim 1 wherein said at least one non-contact sensor comprises at least one laser.

3. The measuring machine of claim 1 wherein said at least one non-contact sensor is movable rotationally about each of said linear directions.

4. The measuring machine of claim 1 wherein said analytical measuring mechanism is operable to provide workpiece measurements with respect to at least one of index, profile and lead characteristic of the teeth of said workpiece.

5. The measuring machine of claim 4 wherein said workpiece measurements are obtained via scanning said teeth along a portion of the tooth surface in said profile direction.

6. The measuring machine of claim 4 wherein said workpiece measurements are obtained via scanning said teeth along a portion of the tooth surface in said face width direction.

7. The measuring machine of claim 1 comprising at least two non-contact sensors located on said machine, said at least two non-contact sensors being oriented at one of said pair of tooth flank surfaces.

8. The measuring machine of claim 1 wherein said functional measuring mechanism and said analytical measuring mechanism are operable simultaneously with one another or independently from one another.

9. The measuring machine of claim 1 comprising functional output data being produced by said functional measuring mechanism and analytical output data being produced by said analytical measuring mechanism, said functional output data and said analytical output data being combined to provide a single platform measurement data.

10. The measuring machine of claim 1 wherein said functional measuring mechanism comprises a roll tester operable for at least one of single flank testing and double flank testing.

11. A method of measuring a toothed workpiece on a measuring machine, said workpiece comprising a gear or other toothed article with said workpiece having a plurality of teeth and with each of said teeth having a pair of tooth flank surfaces, said method comprising:

providing a measuring machine having a functional measuring mechanism operable to roll the toothed workpiece in mesh with a master gear or a mating gear, and an analytical measuring mechanism comprising at least one non-contact sensor movable in up to three mutually perpendicular linear directions and operable to scan at least a portion of a tooth surface of said toothed workpiece in at least one of a profile direction and face width direction, scanning said workpiece, during rolling, with said analytical measuring mechanism to provide workpiece measurements with respect to characteristic of the teeth of said workpiece including at least one of index and profile, and performing one or both of double flank testing and single flank testing with said functional measuring mechanism, wherein the single flank testing comprises the master gear or mating gear rolling together with the toothed workpiece at a fixed center distance with backlash and with only one flank in contact and wherein the toothed workpiece is rotated via a motor.

12. The method of claim 11 wherein said characteristic of the teeth include at least one of index, profile, lead, tooth thickness, angular position of gear teeth, tip and/or root diameter, and chamfer width.

13. The method of claim 11 comprising:
providing a single non-contact sensor,
moving the single sensor relative to said workpiece along a portion of the face width direction of said teeth simultaneously with rotating said workpiece,
generating an output from said single sensor,
determining the lead characteristic of said workpiece from said output.

14. The method of claim 13 further comprising determining index and profile characteristics of said workpiece from said output.

15. The method of claim 11 comprising:
providing at least two non-contact sensors,
positioning said at least two non-contact sensors whereby a portion of the face width direction of said teeth is capable of being scanned,
scanning said teeth simultaneously with rotating said workpiece,
generating an output from said at least two non-contact sensors,
determining the lead characteristic of said workpiece from said output.

16. The method of claim 15 further comprising determining index and profile characteristics of said workpiece from said output.

17. The method of claim 11 comprising:
providing at least one non-contact sensor,
positioning said at least one non-contact sensor with respect to said workpiece whereby a portion of the tooth profile surface of said teeth is capable of being scanned,
scanning said teeth,
generating an output from said at least two non-contact sensors,
determining the index and profile characteristic of said workpiece from said output.

18. The method of claim 17 wherein said positioning between said non-contact sensor with respect to said workpiece varies during said scanning.

19. The method of claim 11 further comprising:
rolling a toothed workpiece in mesh with a master gear or a mating gear
producing functional output data by said functional measuring mechanism and producing analytical output data by said analytical measuring mechanism,
combining said functional output data and said analytical output data to provide a single platform measurement data.

20. The method of claim 11 wherein said functional measuring mechanism and said analytical measuring mechanism are operable simultaneously with one another or independently from one another.

* * * * *